Aug. 13, 1929.　　　　　J. LEDWINKA　　　　　1,724,719
METALLIC DELIVERY BODY FOR MOTOR VEHICLES
Filed Aug. 30, 1924　　　2 Sheets-Sheet 1
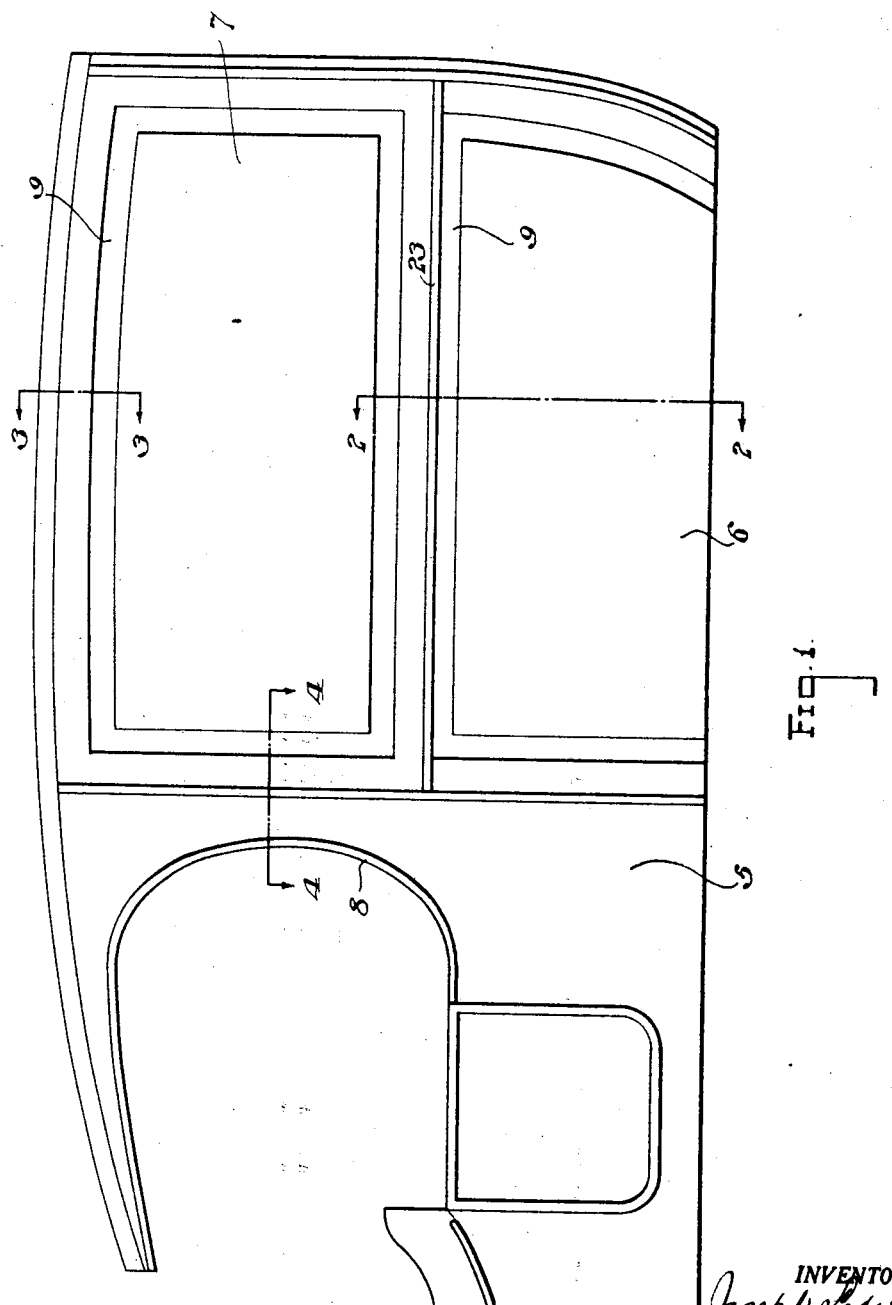
INVENTOR.
Joseph Ledwinka
BY John P. Jarbox
ATTORNEY

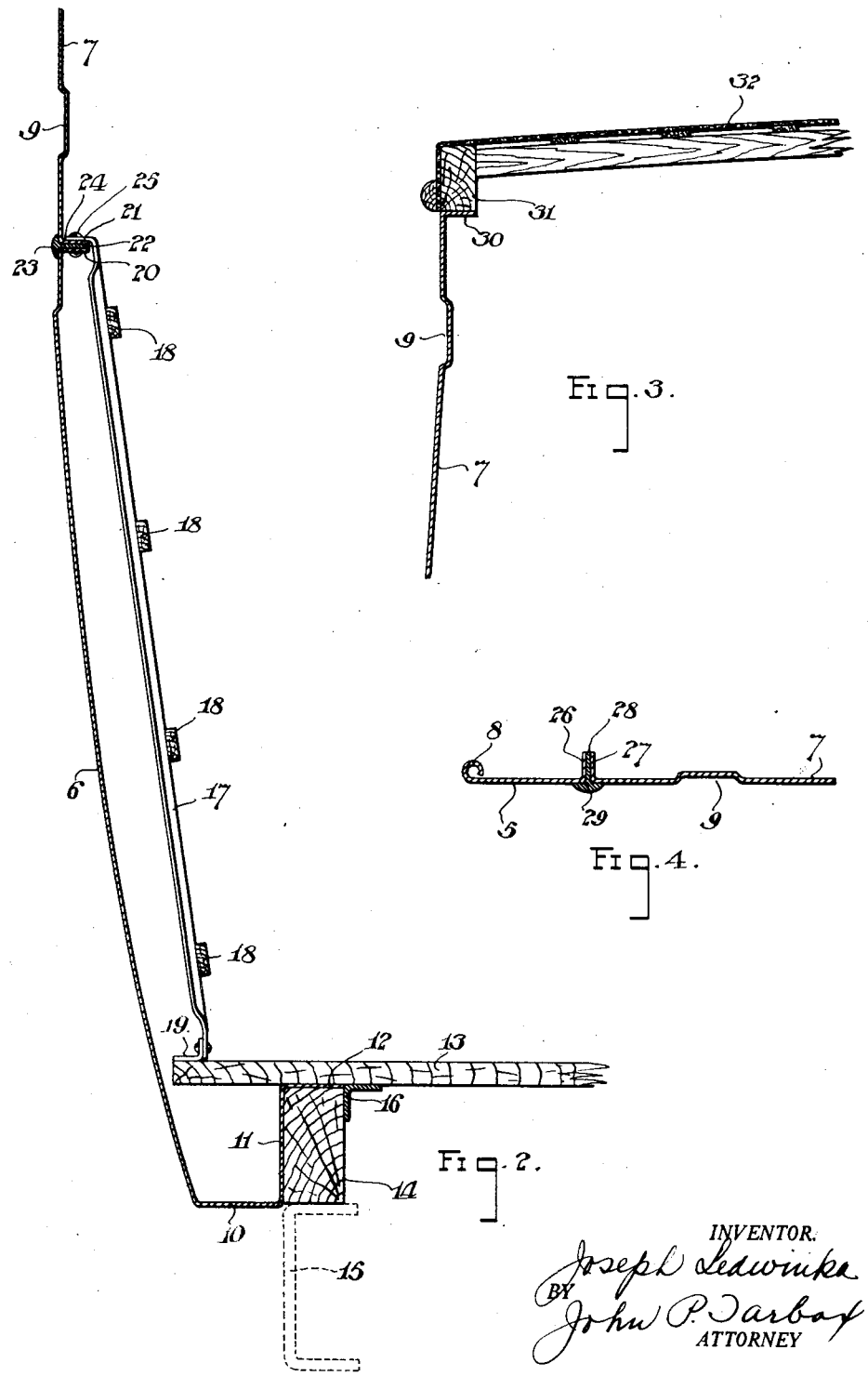

Patented Aug. 13, 1929.

1,724,719

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

METALLIC DELIVERY BODY FOR MOTOR VEHICLES.

Application filed August 30, 1924. Serial No. 735,054.

This invention relates to metallic delivery bodies for motor vehicles.

The object of the invention is to simplify and improve the structure of delivery bodies for motor vehicles and to render the same efficient.

A further object of the invention is to provide a structure of delivery body which is light and durable, wherein light gauge body shell stampings are employed, thereby reducing the cost and weight of the body and wherein the light gauge body shell is protected against injury from the contents of the body during delivery operation of the vehicle.

Other objects of the invention will appear more fully hereinafter.

The invention consists substantially in the construction, combination, location and relative arrangement of parts, all as will be more fully hereinafter set forth as shown in the accompanying drawing, and finally pointed out in the appended claims.

Referring to the accompanying drawing:

Fig. 1 is a view in side elevation of a delivery body constructed in accordance with the principles of my invention.

Figs. 2, 3 and 4 are broken views in section on the lines, 2, 2, 3, 3, and 4, 4, of Figs. 2, 3 and 4, respectively, looking in the direction of the arrows.

The same part is designated by the same reference numeral wherever it occurs throughout the several views.

It has heretofore been found necessary, in order to secure the desired strength and rigidity in the construction of commercial or delivery motor vehicle bodies, to employ heavy gauge metal panelings for the sides of the body because of the rough usage to which such bodies are subjected in the handling and transportation of various kinds of merchandise. I have found, however, that it is possible to employ light gauge metal sheets for the body side stampings, thereby very substantially reducing the weight and, hence, the cost of the structure, without sacrificing anything of ruggedness, strength and rigidity in the structure. To accomplish this result, I propose to employ means whereby the light gauge body panelings are protected against the injury due to the shifting or jolting of merchandise, packages, bundles or the like while being transported in the body. I also propose to stiffen the light gauge body panels to secure the desired rigidity thereof by pressing or otherwise forming suitable channels therein. In order to secure economy in construction and assembly of such bodies, I propose to produce the body panels in sections which are united at their edges in the assembly of the complete body, and to conceal, by suitably beading, the joints between the adjacent sections.

In attaining the objects and purposes of my invention, I build up the body of side panels 5, 6, 7. These panels are stamped or pressed out of thin sheet metal and of the desired shape and contour to constitute, respectively, the sides of the driver's seat portion of the body, and the lower and upper panels, respectively, of the main portion of the body. To secure the desired rigidity in the side panels 5 for the driver's seat portion, I roll or bend over the free edge part thereof, as indicated at 8, in Figs. 1 and 4. Likewise, in order to secure strength and rigidity and stiffness in the main body seat panels 6 and 7, I form said panels with channels 9 pressed therein at suitable points. These channels may be pressed into the panels when the latter are blanked or stamped out, and as plain, simple blanking or stamping operations are all that are required, I am enabled to avoid the use of complicated and expensive die operations.

The lower edge of the body side panels or stampings thus are turned inwardly, as indicated at 10 and these are pressed upwardly, as indicated at 11, and horizontally as indicated at 12 in Fig. 2. This forms in effect a box girder portion in the lower part of the body shell stamping 6, which serves to greatly strengthen the body structure along its lower edges. The horizontally turned flange portions 12 also constitute a support for the floor boards 13 of the body. If desired or required, in order to secure additional strength and rigidity along the lower edges of the body, sill member 14 may be disposed within the angle formed by the portions 11, 12 of the box girder formation of the body panels, said sill members 14 being received and supported upon the chassis side members 15. If desired, and in order still further to efficiently support floor boards 13 an angle member 16 may be employed and applied in the angle between the sill 14 and the floor boards.

In order to protect the thin gauge metal panels thus constituting the lower part of the body against injury or damage due to boxes, packages or the like placed inside the body striking or knocking against the inner surface of the panels, I provide a series of vertically disposed stampings 17 on the inside of the body panel but offset inwardly a substantial distance from the inner surface of said panel. These vertical straps 17 are connected by longitudinally extending strips 18 at suitable points. In order to efficiently anchor the straps 17 in place, the lower edge thereof may be secured in any suitable or convenient way in offset relation with respect to the inner surface of the body panels. In the particular arrangement shown, the lower ends of the straps 17 are secured to angle members 19 which are fastened to the floor 13 near the edge thereof. This also serves as a support to hold the flooring 13 of the body in place, it being understood that a series of vertical straps 17 are applied at both sides of the body, said straps being located at various points along the length of the body, and the strips 18 extending longitudinally of the body. The upper ends of the straps 17 may be secured in any suitable or convenient manner in offset spaced relation with respect to the inner surface of the body panel 6. In the particular arrangement shown, a joint between the upper edge of the lower body panel 6 and the lower edge of the upper body panel 7 is employed for this purpose. This joint is formed by flanging inwardly the upper edge of the lower panel section 6 as indicated at 20, Fig. 2, and likewise by flanging inwardly the lower edge of the upper panel section 7 as indicated at 21. The stem portion 22 of a beaded member is interposed between the inturned flanges 20, 21, the bead 23 thereof serving to conceal exteriorly the joint between the panel sections 6, 7. The upper ends of the straps 17, are flanged outwardly, as indicated at 24, Fig. 2, and said flange 24 and the flanges 21, 20, and the stem 22 of the body strip are all suitably fastened or secured together by rivets, welding or otherwise, as indicated at 25.

In like manner the adjacent vertical edges of the panel members 5 and 6, and 5 and 7, are secured together by inturned flanges, 26 and 27, the stem 28 of a beaded strip being interposed therebetween and secured thereto and the bead 29 conceals the joint exteriorly.

The upper edges of the upper body panels 7 are turned inwardly, as indicated at 30, to form a seat or support for the member 31, of the roof section 32, these parts being suitably secured together in any simple or convenient manner.

From the foregoing description, it will be seen that I provide an exceedingly simple and inexpensive delivery or commercial body structure wherein thin gauge metal is employed for the body panels, thereby securing economy in manufacture without, however, sacrificing anything of strength or rigidity; and I also secure economy in the manner of joining the body panels and in the employment of simple panel sheets which can be easily and quickly produced by simple die operations, and which may be assembled quickly and economically with the joints concealed, and wherein the body side panels are efficiently protected against injury due to the movement and jolting thereagainst of boxes, packages or the like inside of the body during transportation.

Having now set forth the objects and nature of my invention and a structure embodying the principles thereof, what I claim as new and useful and of my own invention, and desire to secure by Letters Patent is:

1. In a closed delivery body structure for motor vehicles, thin sheet metal body panels and a floor supported thereby, and protecting straps for the inner surface of said body panels, said straps being offset from the inner surface of said panels and secured at their lower ends to said floor at points spaced a substantial distance from the adjacent portion of the panel.

2. In a closed delivery body structure for motor vehicles, a thin sheet metal body shell composed of sections having inturned flanges at their meeting edges, said inturned flanges being secured together in combination with vertically disposed straps which are offset from the inner surface of said body panel and secured at their upper ends to said inturned flanges.

3. In a closed vehicle body structure, a self-supporting side panel construction comprising upper and lower sheet metal stampings flanged inwardly at their adjacent edges and joined together through said flanges to form a longitudinally extending stiffening element, the upper stamping being joined at the top to the roof structure and the lower stamping being formed at the bottom into an integral channel section portion, the inner side wall of which is inwardly flanged to form a rabbet adapted to receive the sill.

4. In a vehicle body structure, self supporting side panels comprising integral pressed metal stampings flanged inwardly at their upper edges and reinforced at the bottom by an integral channel section portion, and cross connections between said lower portions of the side members forming therewith a base structure, and vertically disposed protecting straps joining said inwardly extending flanges at the upper edge of the stampings with the base structure but spaced in their bodies from the bodies of the stampings.

5. In a vehicle body structure, a self-supporting vertical side wall comprising a sheet metal stamping formed at the bottom with an integral channel section portion, a transverse member connected thereto at said channel section portion to form therewith a base portion of the body, and a co-extensive inner reinforcing and protecting structure joined to said stamping at the top and to said base portion at the bottom and substantially spaced from the body of the stamping at other points.

In testimony whereof, I hereunto affix my signature.

JOSEPH LEDWINKA.